United States Patent Office 2,765,428
Patented Oct. 2, 1956

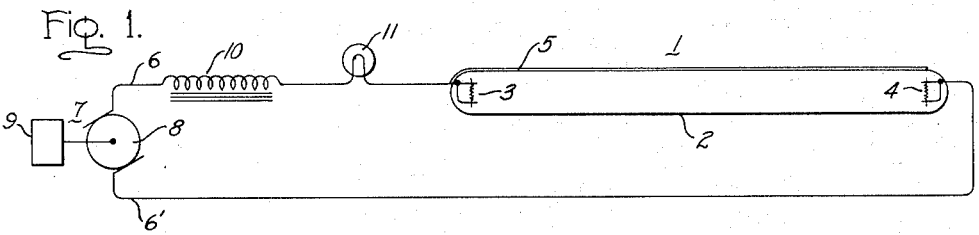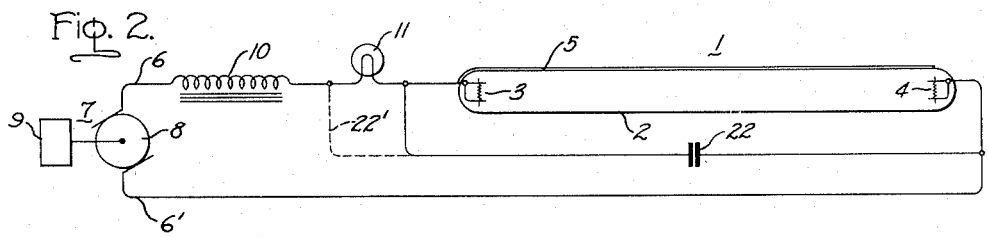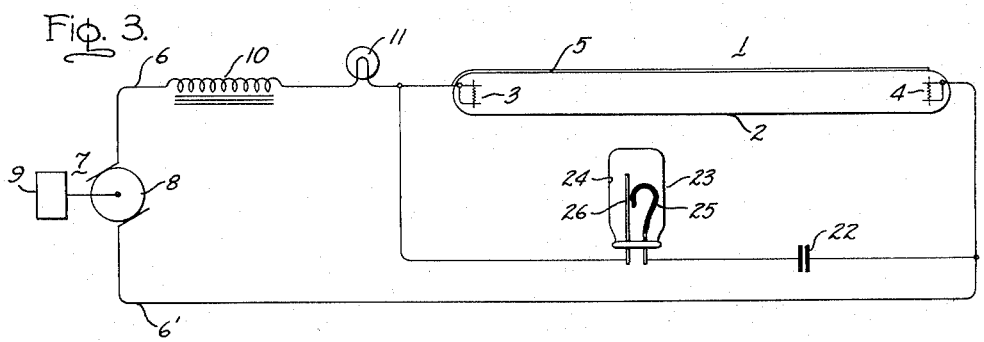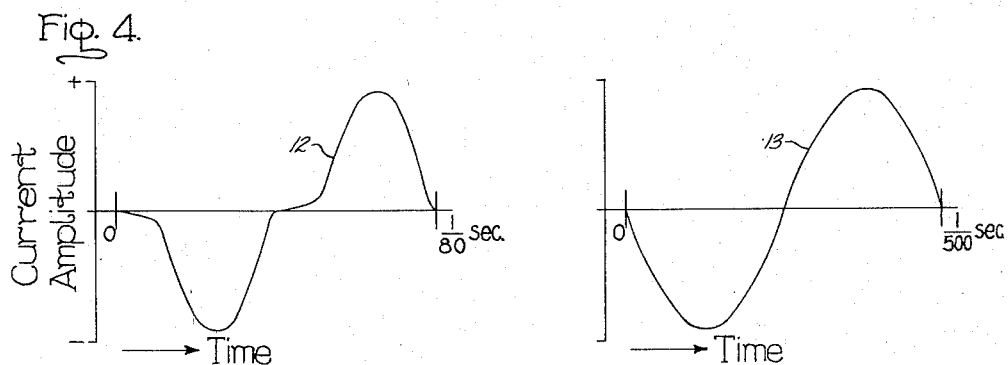

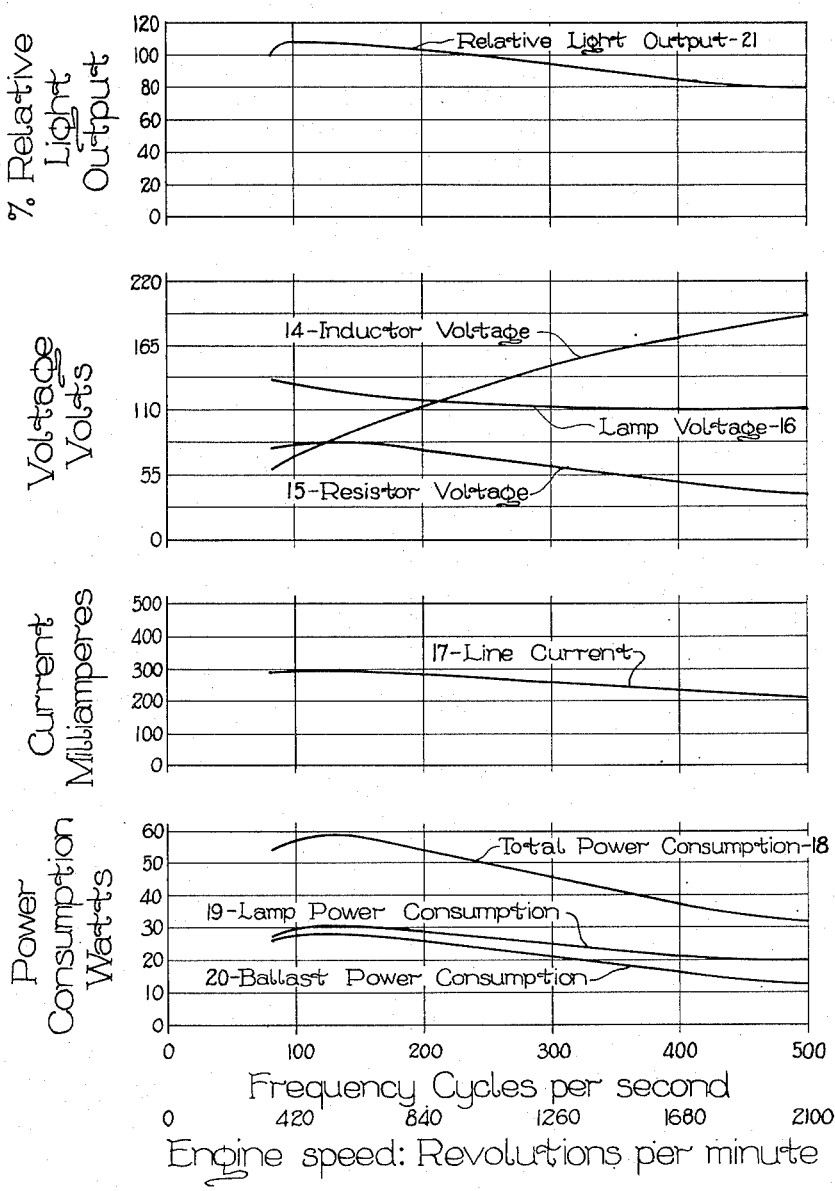

2,765,428

VARIABLE FREQUENCY OPERATION OF FLUORESCENT LAMPS

John H. Campbell, Mentor Headlands, Ohio, assignor to General Electric Company, a corporation of New York Application September 17, 1949, Serial No. 116,306

4 Claims. (Cl. 315—179)

This invention relates to the operation of electric discharge devices, of the type employing ionizable mediums such as gases or vapors, from a variable frequency source. More particularly it relates to the operation of such devices, particularly to the well known fluorescent lamps, in transportation vehicles such as buses and motor coaches which are equipped with alternating current supplies whose frequency varies in accordance with the engine speed of the vehicle.

This application is a continuation-in-part of my copending application Serial No. 779,027, filed October 10, 1947, and assigned to the same assignee of the present application and now abandoned.

One of the factors which has heretofore prevented the application of fluorescent lighting to public transportation vehicles has been the difficulty of converting the low voltage unidirectional current with which buses are usually provided, to a higher voltage alternating current. The usual lighting system for buses in the United States has consisted of a direct current generator and a 12-volt lead storage battery. Operation of fluorescent lamps with such a system has been achieved, in some cases, with individual vibrator inverters for each lamp, and, in other cases, with a centrally located vibrator inverter for all lamps in use. In either case, the efficiency of conversion from low voltage unidirectional current to high voltage alternating current is low, and maintenance of the vibrators is costly, so that such systems have not found wide commercial acceptance.

My invention is concerned with the operation of fluorescent lamps in conjunction with a new type of alternating current power supply which is now becoming commercially available for buses and motor coaches. This power supply consists of a constant voltage alternating current generator whose armature is mechanically coupled to the engine or power plant of the vehicle. In accordance with well known principles, the frequency of the voltage supplied then varies proportionally to the operating speed of the engine. In a typical variable frequency electrical system for buses, the output voltage is maintained constant at 220 volts, and the frequency varies from 80 to 500 cycles per second over a vehicle speed varying from 8 to 50 miles per hour.

Accordingly, it is an object of my invention to provide a new and improved circuit for operating a fluorescent lamp from a variable frequency voltage supply.

Another object of my invention is to provide a new and improved starting and operating circuit for a fluorescent lamp utilized in transportation vehicles having a constant voltage alternating current supply whose frequency varies, proportionally to the speed of the vehicle, through a range of 1 to 6.

For additional objects and advantages and for better understanding of the invention, attention is now directed to the following description and accompanying drawings. The features of my invention believed to be novel will be more particularly pointed out in the appended claims.

In the drawings:

Fig. 1 is a schematic illustration of a circuit embodying my invention and comprising a fluorescent lamp, an alternator driven directly from a motor, and a current limiting ballast.

Fig. 2 is a schematic diagram of a similar circuit incorporating a slight modification to provide a resonant starting feature.

Fig. 3 is a schematic diagram of a similar circuit which has been further modified by the addition of a thermal glow-switch for improving the operating efficiency.

Fig. 4 contains curves illustrating the current characteristics of fluorescent lamps at different operating frequencies.

Fig. 5 is a chart illustrating graphically the operating characteristics of an actual construction of a variable frequency fluorescent lamp bus lighting system embodying my invention.

Referring to Fig. 1, there is shown an electric discharge device 1 such as a fluorescent lamp, which comprises an elongated tubular cylindrical envelope 2 having sealed into the ends thereof filamentary electrodes 3 and 4. Each electrode is illustrated as comprising a coil, preferably in the form of a coiled coil of tungsten wire activated with oxides of alkaline earth metals, such as a mixture of barium and strontium oxides. The envelope 2 contains a rare gas such as neon, argon or mixtures thereof at a pressure of a few millimeters, and a small quantity of mercury which, during the operation of the lamp, has a pressure of the order of 10 microns. The device 1 may be a low-pressure positive-column lamp of a fluorescent type provided with a suitable phosphor or fluorescent coating. This fluorescent coating, upon excitation by the radiation produced by an electric discharge between the electrodes, transforms short wave-length radiation due to the discharge, into longer wave-length radiation occurring substantially within the visible spectrum. For ease in starting, an auxiliary electrode may be mounted on the outside of envelope 1 and connected to one of the electrodes. This auxiliary electrode may consist of a strip 5 of conductive material, constituted by a metallic paint or graphite mixed with potassium silicate applied to the surface of envelope 2, and is commonly known as a starting stripe.

In accordance with my invention, device 1 is connected to a pair of conductors 6—6'. These conductors are energized from a power supply 7 which comprises an alternating current generator 8 driven directly by a motor 9 which may, for instance, be the internal combustion engine of a transportation vehicle. The output voltage of generator 8 is held constant by means of a voltage regulator, not illustrated in the drawing. In a typical system, the output voltage of generator 8 is held constant at 220 volts, while the frequency varies between the limits of 80 to 500 cycles per second, in accordance with the speed of the vehicle.

An inductive ballast in which current limiting is achieved by means of a series inductive reactance cannot be utilized with such a variable frequency supply. The reactance of an inductor is directly proportional to the operating frequency, and accordingly the voltage applied to the lamp would be inversely proportional to the engine speed of the vehicle. The lamp current and the light output would then decrease proportionally to the vehicle speed and the system would be impractical. In the same vein, the reactance of a capacitor is inversely proportional to the operating frequency and the light output would increase proportionally to the vehicle speed, so that a capacitive ballast is also impractical.

If a resistive ballast is used, stable operation may be achieved because the current flowing through a resistance is independent of frequency. However, such a ballast is very uneconomical because a large proportion of the electrical energy is converted into heat in the ballast which must be uselessly dissipated. Moreover, with a resistive ballast, the starting requirements of fluorescent lamps are very difficult to achieve. This is due to the fact that in a typical lamp, the required starting voltage is of the order of 2 to 5 times the operating voltage. Thus, to operate a fluorescent lamp with a resistive ballast would require that the system be designed to provide at all times a voltage at least 2 or 3 times greater than the voltage gainfully utilized at the lamp during operation. After the lamp has started and while it is operating, the difference between the voltage generated and that utilized by the lamp is uselessly dissipated in the resistive ballast, whence very low operating efficiency.

In accordance with my invention, the problem of operating a fluorescent lamp from a variable frequency constant voltage source at high efficiency is solved by means of a circuit which comprises an inductive reactance, a resistance having a positive temperature characteristic, and, preferably, a fluorescent lamp having a light generation efficiency which increases with the frequency of the applied voltage. In general, the low wattage fluorescent lamps commercially available at present have this required property of a light generation efficiency which increases with the frequency of the applied voltage. By properly proportioning these three elements, I have succeeded in operating a fluorescent lamp at high efficiency from an alternating current source whose frequency may vary in a ratio of 1 to 6, while the relative light output varies less than ±15 per cent.

Referring to Fig. 1, I provide a ballast comprising two component parts, namely, an inductor 10 and a resistor 11, connected in series with each other and with lamp 1 across the constant voltage variable frequency supply 6—6'. Inductor 10 is designed to be most effective in limiting the current flowing to the lamp at the highest operating frequency, namely, at 500 cycles per second. Resistor 11, on the other hand, is designed to be most effective in limiting the current flowing to the lamp at the lowest operating frequency, namely, at 80 cycles per second. Resistor 11 must have a positive temperature coefficient of resistance, that is, it must have a resistance which increases with the temperature of the element, the temperature obviously increasing with the current flowing therethrough. For instance, resistor 11 may be provided by a tungsten filament lamp, comprising a fine tungsten wire mounted in a sealed glass envelope containing an atmosphere of nitrogen.

At the low end of the frequency range of the generator, resistor 11 provides the greater portion of the ballasting action. As the frequency increases, the reactance of inductor 10 increases proportionally and the current flowing through the lamp tends to decrease proportionally. However, the reduction in current causes the temperature of the tungsten filament resistor 11 to drop, so that its resistance decreases and counteracts somewhat for the increased reactance of inductor 10. Thus, the use of a resistor having a positive temperature coefficient prevents the large variation in current that would otherwise occur were a constant temperature coefficient resistor utilized.

As is well known, the voltage drops across inductor 10 and across resistor 11 have phase angles displaced by substantially 90°, so that the resultant voltage drop is determined by vectorial addition. In the lower range of frequencies, resistor 11 is the main current limiting factor; in the upper range, inductor 10 is the main factor; in the intermediate range, both resistor 11 and inductor 10 contribute to current limiting, and due to the addition of the voltage drops at 90°, the resultant is substantially constant. In the upper range, the fact that the current is reduced, produces a decrease in the resistance of resistor 11, which prevents the reduction in current from being as large as it otherwise would be. The circuit of Fig. 1 accordingly provides to a lamp 1 a current which decreases slightly as the frequency of the supply approaches its upper limit. The relative change in current is much less than would occur were an inductance and a constant resistance utilized. However, the change in current is still greater than could be tolerated in some commercial applications wherein the light output varies directly as the lamp current. In accordance with another feature of my invention, this current characteristic of the circuit is gainfully utilized by combining it with the relative light output characteristics of certain fluorescent lamps in accordance with principles which will now be described.

Referring to Fig. 4, curve 12 illustrates the current through a fluorescent lamp at a relatively low frequency when the current is limited solely by a resistive ballast. Under such conditions, the current and voltage are nearly in phase, but the current wave is distorted and has departed considerably from a sinusoidal curve. This is due to the relatively high re-ignition voltage required at low frequencies. In other words, the gaseous column in the lamp is practically de-ionized at every half cycle of the applied voltage, so that there is produced a time lag during which the lamp must re-ionize before full conduction occurs on the following half cycle of the alternating current wave. As the frequency increases, the gaseous column has less time in which to de-ionize between consecutive half cycles of the applied voltage; accordingly, the ignition of the arc occurs at a lower instantaneous voltage. This results in an improved current wave form, as illustrated by curve 13, from which follows an increase in lamp efficiency. Stated in another way, the persistence of ionization causes the fluorescent lamp to produce the same amount of illumination for a lesser effective current at the high frequency end of the operating range as compared with the low frequency end. For a fuller explanation of these phenomena, reference is made to the article "High frequency operation of fluorescent lamps" by John H. Campbell in Illuminating Engineering, vol. XLIII, No. 2, February 1948.

By properly proportioning inductor 10 and resistor 11 with a suitable choice of fluorescent lamp, I have provided an illuminating system in which the relative light output varies less than 20 per cent throughout the normal operating range of a vehicle. In an actual construction, I have utilized a commercially available fluorescent lamp of the 42-inch T6 slimline type. These lamps, which are well known in the art, have a cross sectional diameter of ¾ inch, and, when operated with a lamp current of 300 milliamperes, consume approximately 30 watts.

Fig. 5 illustrates the current and voltage characteristics of an actual construction of a circuit utilizing such a lamp. The curves are plotted to cover a frequency scale extending from 80 to 500 cycles per second, which corresponds to vehicle motor speeds of 336 revolutions per minute and 2100 revolutions per minute, respectively. Curves 14 and 15 indicate the voltage drops across inductor 10 and resistor 11 respectively, whereas curve 16 indicates the voltage across the fluorescent lamp. Curve 17 indicates the variation in line current with frequency throughout the operating range. In the range from 80 to 500 cycles per second, the decrease in line current from .30 to .21 amperes occurs with voltage drop across resistor 11 of 83 and 37 volts, respectively, as shown by the curves of Fig. 5. By computation from these figures, it will be seen that this decrease in line current causes a decrease in the resistance of tungsten filament lamp resistor 11 from 277 to 176 ohms. Thus, in this actual construction, the ratio of currents as between 500 cycles and 80 cycles is 1.43; whereas, the ratio of resistances of resistor 11 for the same range is 1.57. These ratios are comparable in magnitude; and in this preferred embodiment of the invention the percentage change in resistance is greater than the percentage change in current. Were it not for the positive temperature coefficient characteristic of resistor 11, the decrease in lamp current with increasing frequency would be much greater. Curve 18 indicates the total power consumption or watts absorbed by the circuit including inductor 10, resistor 11 and fluorescent lamp 1. It will be observed that the total power consumption decreases markedly with increasing frequency and at 400 cycles per second, which corresponds to a motor speed of 1680 R. P. M., the total energy consumption is considerably less than at the low frequency end of the range. This is due to the fact that at the higher frequency, very little voltage drop occurs across resistor 11 and most of the voltage drop occurs across inductor 10 which, being a reactive element, does not consume as much energy. Curves 19 and 20 indicate the power consumption of the lamp and of the ballast, respectively. Curve 21 indicates the relative light output from the lamp, and it will be observed that the total variation is less than 15 per cent from the mean occurring at 300 cycles per second. It has been found in practice that such a variation is entirely tolerable, and, since any change in intensity occurs relatively slowly and at the same rate as the variation in the vehicle speed, it produces no discomfort on the part of the passengers.

Fig. 2 illustrates a starting and operating circuit, wherein the same reference numerals as in Fig. 1 indicate corresponding elements, and wherein the circuit has been modified by the addition of a shunt capacitor 22 across the cathodes of lamp 1. Capacitor 22 is selected so that at a particular frequency, its capacitive reactance is equal to the inductive reactance of inductor 10. At this particular frequency the circuit is in series resonance, so that a high voltage occurs across lamp 1 under starting conditions.

In a vehicle or motor bus lighting application, the lamp can be started with the bus at a standstill by increasing the engine speed to obtain a supply frequency of 400 cycles per second, for instance. After the lamp has started, the engine may be idled without any noticeable change in the light output of the lamp. If capacitor 22 is increased in capacitance rating, starting of the lamp may be obtained at lower frequencies, but the waveform of the current through the lamp will be distorted, resulting in a shortened lamp life. An alternative connection for capacitor 12 is shown by the dotted line 22'. This connection permits the developing of a higher voltage across the lamp at resonance, than with the former connection.

Fig. 3 illustrates a modification of Fig. 1, wherein the same reference numerals indicate corresponding circuit elements as in Figs. 1 and 2 and in which provision is made for starting lamp 1 at lower frequencies by utilizing a glow switch 23 in series with capacitor 22. Glow switch 23 and capacitor 22 are connected to form a series circuit which is placed in shunt across the lamp electrodes. When it is desired to start the lamp through resonance at a relatively low frequency such as, for instance, 80 cycles per second, a relatively large value of capacitance is provided for capacitor 22. If this capacitor is left in the circuit after the lamp has started, it draws an excessively large current at the high frequency end of the operating range of the system, and will not only shorten the life of the lamp, but will, in addition, waste power and disturb the regulating characteristics of the circuit. Accordingly, glow switch 23 is provided for the purpose of disconnecting capacitor 22 from the circuit after the lamp has started so that it does not affect the lamp characteristics during normal operation. Glow switch 23 comprises a glass bulb 24 filled with rare gas such as neon or argon, a U-shaped bimetallic strip 25 and a fixed terminal 26.

When voltage is first applied and the lamp has not yet started, the gas in switch 23 ionizes and the heat developed actuates bimetallic strip 25 so that it makes contact with the fixed terminal 26, thereby allowing capacitor 22 to form a series resonant circuit with inductor 10. The resonance condition provides a voltage high enough to cause an arc discharge to occur between electrodes 3 and 4 and start the lamp. The glow discharge in switch 23 was previously extinguished when bimetallic strip 25 contacted terminal 26, so that the strip cools and in a very short time the contact is interrupted and capacitor 22 is disconnected from the circuit. During normal operation of lamp 1, there is not enough voltage across it to cause switch 23 to glow, so that its contacts remain permanently opened, until it is desired to start the lamp again.

While certain specific embodiments have been shown and described, it will, of course, be understood that various modifications may be made without departing from the invention. It will be apparent from the description that has been given that the successful operation of a fluorescent lamp from a constant voltage variable frequency alternating current supply by means of a high efficiency circuit such as has been described, depends primarily upon the combination of a suitable value of inductor with a resistor having a positive resistance temperature characteristic. Secondly, and to a lesser extent, it depends upon the use of a lamp having an efficiency which increases with frequency. Inasmuch as all these factors are properly related, the variation in the relative light output of the lamp may be maintained within commercially tolerable limits, while the circuit efficiency is maintained high at the average operating frequency, in this case corresponding to the average running speed of the vehicle.

It will be understood that the example which has been given and the application which has been described are simply illustrative and in no sense limiting. The appended claims are, therefore, intended to cover any modifications falling within the true spirit and scope of the invention.

What I claim as new and desire to secure by Letters Patent of the United States is:

1. A vehicular lighting system comprising a constant voltage source of alternating current varying in frequency between operating limits of about 80 to 500 cycles per second in accordance with the engine speed of the vehicle, an electric discharge lamp of the type including an ionizable medium and a pair of cooperating electrodes, said lamp having a light conversion efficiency which increases measurably with frequency within said limits, an operating and ballasting circuit comprising a resistor and an inductor connected in series with said lamp across said source, said resistor having a positive temperature coefficient of resistance and proportioned for an increase in resistance by a ratio greater than the ratio of currents therethrough within said range, the magnitudes of said resistor and inductor being such that the former effectively limits the current through said lamp to a first value at 80 cycles per second and the latter to a second value at 500 cycles per second, said first and second values being in a ratio approximately 1.4 to 1 in order to achieve, in conjunction with the increasing efficiency of said lamp with frequency, a light output from said system varying by not more than plus or minus 15 percent between said limits.

2. A vehicular lighting system comprising a constant voltage source of alternating current varying in frequency between operating limits of about 80 to 500 cycles per second in accordance with the engine speed of the vehicle, an electric discharge lamp of the type including an ionizable medium and a pair of cooperating electrodes, said lamp having a light conversion efficiency which increases measurably with frequency within said limits, an operating and ballasting circuit comprising a tungsten filament lamp and an inductor connected in series with said lamp across said course, said tungsten lamp having a positive temperature coefficient of resistance and a rating providing an increase in resistance of approximately 1 to 1.6 for an increase in current of approximately 1 to 1.4 therethrough within said limits, the rating of said tungsten lamp, and the magnitude of said inductor being such that the former effectively limits the current through said lamp to a first value at 80 cycles per second and the latter to a second value at 500 cycles per second, said first and second values being in a ratio of approximately 1.4 to 1 in order to achieve, in conjunction with the increasing efficiency of said lamp with frequency, a light output from said system varying by not more than plus or minus 15 percent between said limits.

3. A vehicular lighting system as defined in claim 2 and including in addition a capacitor connected in parallel with said lamp and having a value effecting series resonance with said inductor at a frequency between said limits.

4. A vehicular lighting system as defined in claim 2 and including in addition a series combination of a capacitor and a glow switch shunted across said lamp, said capacitor having a value effecting series resonance with said inductor at a frequency between said limits.

References Cited in the file of this patent
UNITED STATES PATENTS

| | | |
|---|---|---|
| 1,984,489 | Mutsaers | Dec. 18, 1934 |
| 2,030,414 | Uyterhoeven | Feb. 11, 1936 |
| 2,030,426 | Blok | Feb. 11, 1936 |
| 2,046,980 | Van Wijk | July 7, 1936 |
| 2,266,619 | Campbell | Dec. 16, 1941 |
| 2,504,594 | Schouwstra | Apr. 18, 1950 |